(12) United States Patent
Polen

(10) Patent No.: US 6,543,999 B1
(45) Date of Patent: Apr. 8, 2003

(54) WINDMILL

(76) Inventor: James Van Polen, 3253 Echo La., Bussey, IA (US) 50044

( * ) Notice: Subject to any disclaimer, the term of this patent is extended or adjusted under 35 U.S.C. 154(b) by 0 days.

(21) Appl. No.: 10/077,690

(22) Filed: Feb. 15, 2002

(51) Int. Cl.$^7$ ................................................. F03D 7/06
(52) U.S. Cl. ........................................ 416/17; 416/116
(58) Field of Search ................................ 416/116, 111, 416/113–115, 109, 17

(56) References Cited

U.S. PATENT DOCUMENTS

| | | |
|---|---|---|
| 41,442 A | 2/1864 | Morse |
| 83,620 A | 11/1868 | Frazee |
| 180,603 A | 8/1876 | Leach |
| 215,753 A | 5/1879 | Kelsey |
| 298,570 A | 5/1884 | Foster |
| 331,288 A | 12/1885 | Ellsworth |
| 385,674 A | 7/1888 | Lockwood |
| 406,259 A | 7/1889 | Carpenter |
| 512,712 A | 1/1894 | Kelso |
| 603,905 A | 5/1898 | Humphrey |
| 615,782 A | 12/1898 | Bartholomew |
| 622,420 A | 4/1899 | Fisher |
| 897,132 A | 8/1908 | Pacey |
| 1,363,174 A | 12/1920 | Bellows |
| 1,527,097 A | 2/1925 | Watson |
| 1,539,157 A | 5/1925 | Cherepes |
| 1,540,609 A | 6/1925 | Debay |
| 1,915,689 A | 6/1933 | Moore |
| 2,397,346 A | 3/1946 | Gimenez |
| 2,441,635 A | 5/1948 | Iverson |
| 2,990,887 A | 7/1961 | Darrah |
| 3,382,931 A | 5/1968 | Dejussieu-Pontcarral et al. |
| 3,877,836 A | 4/1975 | Tompkins |
| 4,113,408 A * | 9/1978 | Wurtz et al. .................. 416/17 |
| 4,186,313 A * | 1/1980 | Wurtz ......................... 416/116 |
| 4,247,251 A | 1/1981 | Wuenscher |
| 4,247,253 A | 1/1981 | Seki et al. |
| 4,260,328 A | 4/1981 | Hamel |
| 4,278,894 A | 7/1981 | Ciman |
| 4,377,372 A | 3/1983 | Stutzman |
| 4,380,417 A | 4/1983 | Fork |
| 4,383,801 A | 5/1983 | Pryor |
| 4,392,780 A | 7/1983 | Taft |
| 4,507,049 A | 3/1985 | Strandgren |
| 4,609,827 A | 9/1986 | Nepple |
| 4,764,090 A | 8/1988 | Danson |
| 4,799,860 A | 1/1989 | Martin |
| 5,083,902 A | 1/1992 | Rhodes |

FOREIGN PATENT DOCUMENTS

GB         306772 A   *  2/1929  ................. 416/116

* cited by examiner

Primary Examiner—Christopher Verdier
(74) Attorney, Agent, or Firm—Davis Brown Law Firm; Daniel A. Rosenberg; Kent A. Henrink

(57) ABSTRACT

A windmill is provided wherein the windmill comprises a central rotating shaft with an upper and a lower end opposite thereto. A blade arm is provided with an inward and an outward end opposite thereto, wherein the inward end of the blade arm is connected to the upper end of the rotating shaft. An aerodynamically shaped foil connects to the outward end of the blade arm. A cam frame connects to the central rotating shaft such that the cam frame remains substantially stationary when the central rotating shaft rotates. An outer tilted cam track connects to the cam frame, and an inner tilted cam track connects to the cam frame and is located inside the outer tilted cam track, wherein an axis of tilt of the outer cam track and an axis of tilt of the inner cam frame are transversely aligned. A roller unit is provided comprising an arm connected to the blade arm and extending downward and a pivotable roller connected thereto, wherein the pivotable roller is in operable contact with the inner and the outer cam track such that when the blade arm rotates the pivotable roller pivots between the axes of the inner and outer cam tracks. A tilt assembly connects to the roller unit and to the foil for tilting the foil in response to movement of the roller on the axes of the inner and outer cam tracks in order to maintain an appropriate angle of attack relative to the wind.

10 Claims, 4 Drawing Sheets

WINDMILL

BACKGROUND OF THE INVENTION

The present invention relates to a windmill. In particular to a windmill with an aerodynamically shaped foil rotating about a central shaft, wherein the position of the foil relative to the wind is controlled by a tilt assembly and roller unit in operative contact with an inner and outer cam track.

For many years, windmills have been used to harness wind energy for a variety of purposes. Particularly, in the later part of the 19$^{th}$ century and the early part of the 20$^{th}$ century, windmills gained favor for use in pumping water from wells and later for generating electricity. A great deal of interest in these devices existed around this time.

Due to technological innovations, windmills declined in popularity in favor of fossil fuel based sources of energy. However, especially, in rural areas, use of windmills continues to this day. Recently, with increased attention paid to the environmental problems associated with forms of energy that rely on fossil fuels, and with technological innovations associated with the use of renewable energy sources, attention again has returned to windmills as a significant alternative source of energy.

One of the innovations applied to windmills comprises the use of aerodynamically shaped blades or foils, which create lift to more efficiently capture wind energy. The blades utilize a wing shape that creates high pressure on one side of the blade and low pressure on the other. By properly positioning the blades relative to the wind—known as the angle of attack, the pressure differential will increase the rotational speed of the windmill, thereby resulting in more efficient operation. Prior art devices have employed a number of means of accomplishing this type of windmill operation, however, heretofore, these devices involve either a complex combination of mechanical components or utilize older technologies that do not translate well to modern economies of scale.

Thus, a need exists for a more efficient and reliable windmill apparatus.

SUMMARY OF THE INVENTION

An object of the present invention comprises providing a windmill that utilizes a more efficient and reliable apparatus to maintain the proper angle of attack of an aerodynamically shaped foil relative to the wind.

These and other objects of the present invention will become apparent to those skilled in the art upon reference to the following specification, drawings, and claims.

The present invention intends to overcome the difficulties encountered heretofore. To that end, a windmill is provided wherein the windmill comprises a central rotating shaft with an upper and a lower end opposite thereto. A blade arm is provided with an inward and an outward end opposite thereto, wherein the inward end of the blade arm is connected to the upper end of the rotating shaft. An aerodynamically shaped foil connects to the outward end of the blade arm. A cam frame connects to the central rotating shaft such that the cam frame remains substantially stationary when the central rotating shaft rotates. An outer tilted cam track connects to the cam frame, and an inner tilted cam track connects to the cam frame and is located inside the outer tilted cam track, wherein an axis of tilt of the outer cam track and an axis of tilt of the inner cam frame are transversely aligned. A roller unit is provided comprising an arm connected to the blade arm and extending downward and a pivotable roller connected thereto, wherein the pivotable roller is in operable contact with the inner and the outer cam track such that when the blade arm rotates the pivotable roller pivots between the axes of the inner and outer cam tracks. A tilt assembly connects to the roller unit and to the foil for tilting the foil in response to movement of the roller on the axes of the inner and outer cam tracks in order to maintain an appropriate angle of attack relative to the wind.

DETAILED DESCRIPTION OF THE INVENTION

Figure 1:
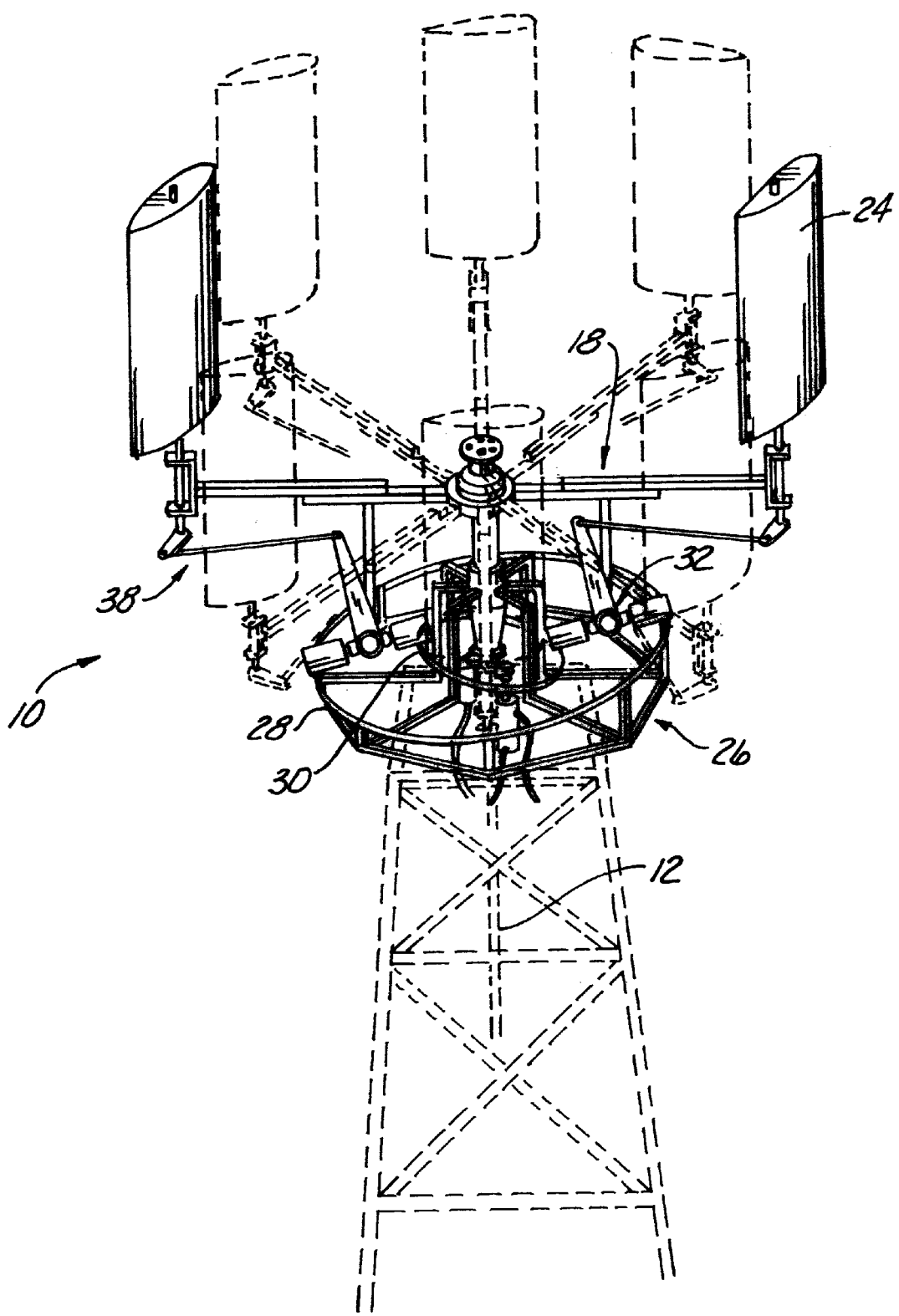
FIG. 1 shows a perspective view of a windmill.
Figure 3A:
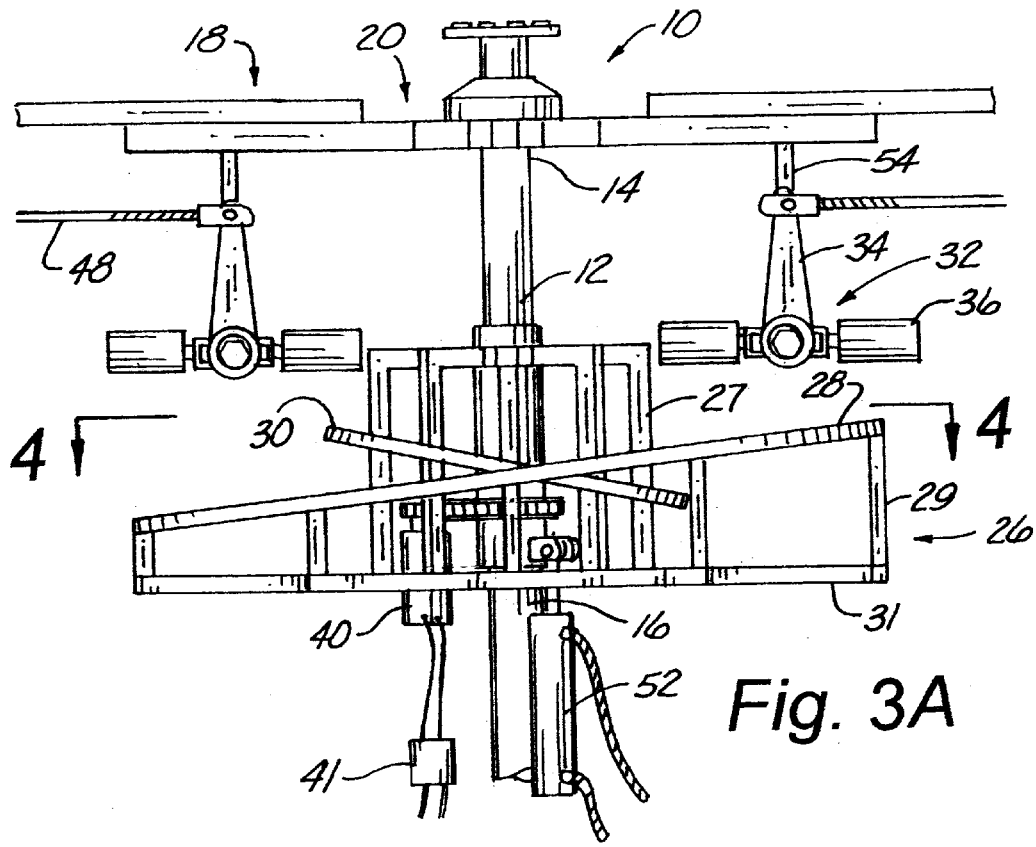
FIG. 3A shows a side view of the windmill in a disengaged position.
Figure 3B:
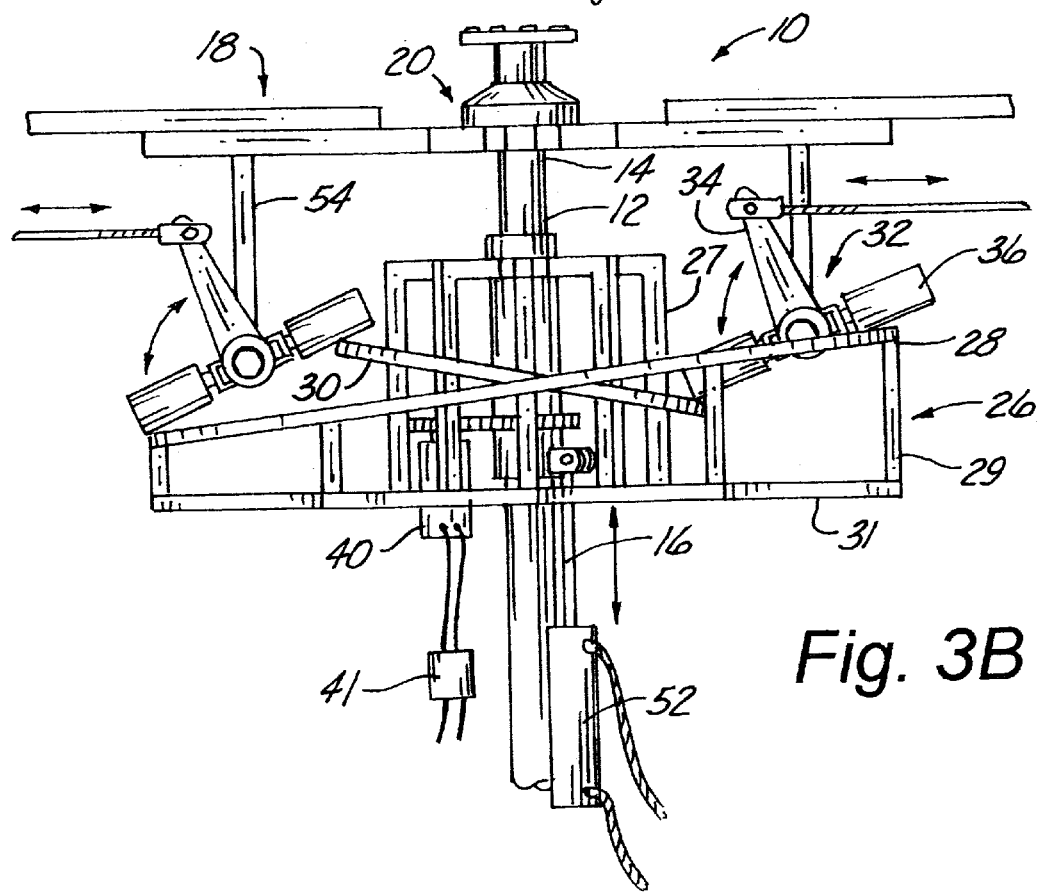
FIG. 3B shows a side view of the windmill in an engaged position.
Figure 4:
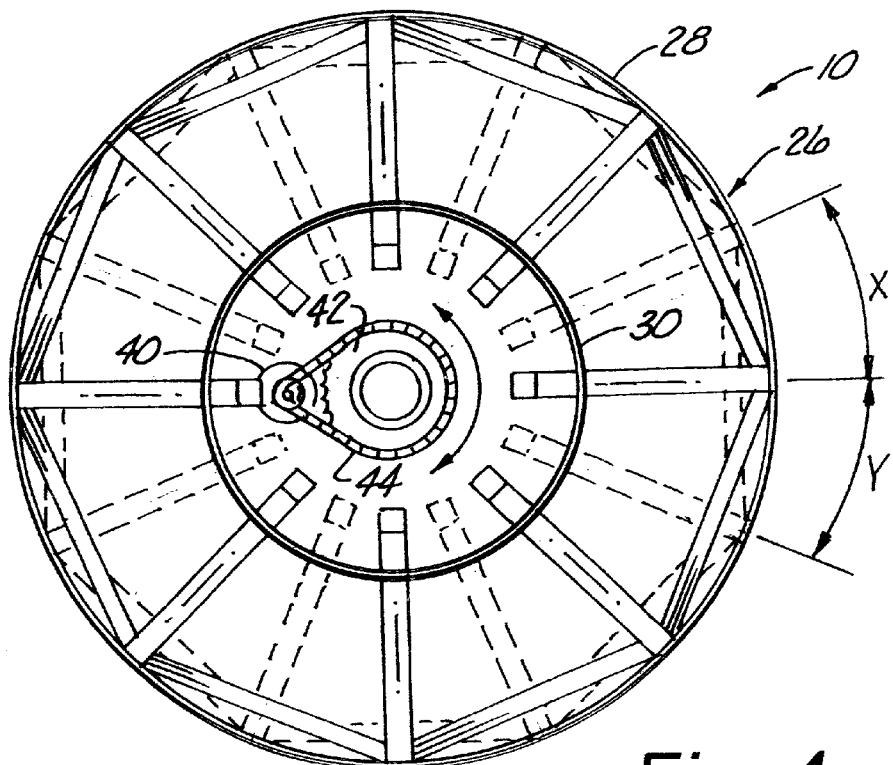
FIG. 4 shows a top view of the windmill taken along the line 4—4 shown in FIG. 3A.

In the figures, FIG. 1 shows a windmill 10 comprised of a central rotating shaft 12 with an upper end 14, and a lower end 16 (see FIGS. 3A–3B). The windmill 10 also includes a plurality of blade arms 18 extending radially outward from the upper end 14 of the central rotating shaft 12. In particular, the blade arms 18 include an inward end 20 connected to the upper end 14 of the central rotating shaft 12, and an outward end 22 extending opposite thereto. An aerodynamically shaped foil 24 is connected to the outward end 22 of each of the plurality of blade arms 18. Configured in this manner the foils 24 and blade arms 18 rotate freely along with the central rotating shaft 12.

The windmill 10 also includes a cam frame 26 connected to the lower end 16 of the central rotating shaft 12 such that the central rotating shaft 12 is telescopically contained inside the inner portion of the cam frame 26. In this arrangement, the central rotating shaft 12 moves freely while the cam frame 26 remains substantially stationary. The cam frame 26 is comprised of a plurality of generally Z-shaped frame members 27 that extend outwardly from the central rotating shaft 12 then downward, and then radially outward until the frame members 27 are enclosed by connecting members 31. Struts 29 extend upward from the points where the connecting members 31 and the frame members 27 join. An outer tilted cam track 28 is connected to the upper end of the struts 29. An inner tilted cam frame 30 is connected to the downward portion of the frame members 27. Shown best in FIGS. 3A–3B the outer tilted cam track 28 and the inner tilted cam track 30 are aligned such that the axis of tilt of the inner and outer tilted cam frames 28, 30 are transversely aligned.

Figure 2:
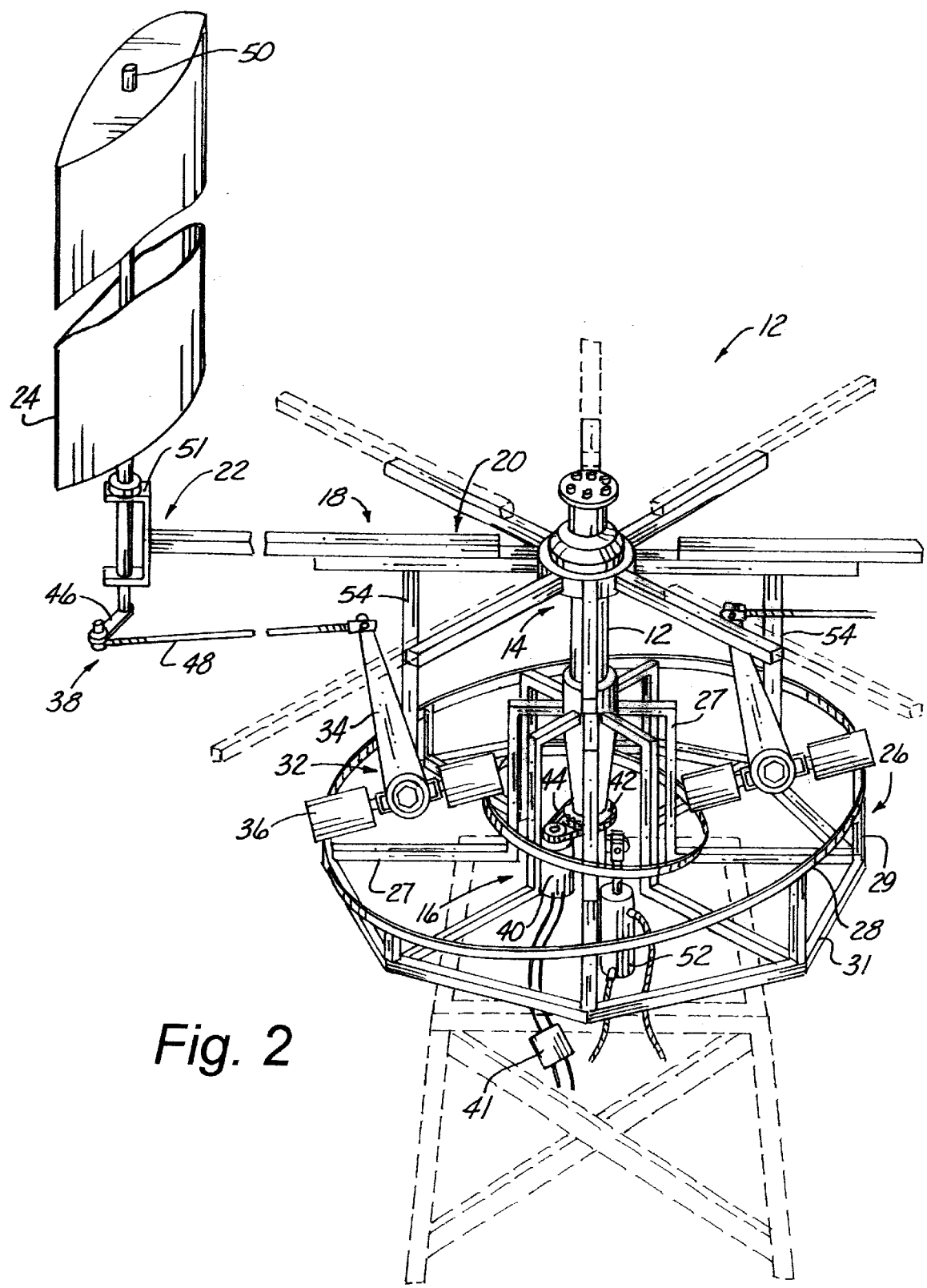
FIG. 2 shows a partial perspective view of the windmill.
Figure 5:
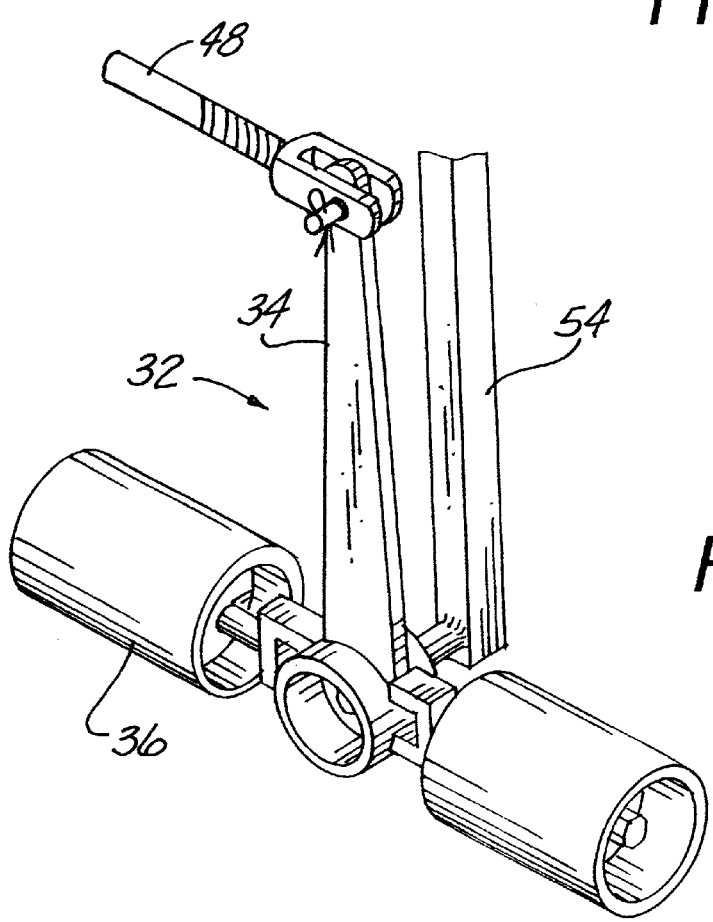
FIG. 5 shows a perspective view of a roller unit of the windmill.

Roller units 32, secured to a downward extending portion 54 of the blade arms 18, engage with the inner and outer tilted cam tracks 28, 30 as shown in FIGS. 1, 2, and 3B. The roller unit 32 includes a pivotable roller 36 that actually engages the cam tracks 28, 30 as shown in FIG. 3B, and also includes an upward extending arm 34. The upward extending arm 34 connects to a tilt assembly 38. The tilt assembly 38 is comprised of an extension member 48 that connects to the upward end of the arm 34 (see FIG. 5), and a rotating tilt collar 46 that attaches to a shaft 50 that extends upward and through the aerodynamically shaped foil 24. Additionally, as shown best in FIG. 2, the shaft 50 passes through a C shaped collar 51 located at the outward end 22 of the blade arm 18. In this manner, the roller unit 32 operatively connects through tilt assembly 38 to the aerodynamically shaped foil 24.

The windmill 10 also includes a hydraulic motor 40 that is connected to a wind sensor 41 to position the cam frame 26 relative to the wind direction. A gear 42 is attached to the inner portion of the cam frame 26 and a chain 44 connects the gear 42 to the motor 40. In this manner, the motor 40 can rotate the cam frame 26 as necessary to position the inner and outer tilted cam tracks 28, 30 based on wind direction so as to allow for achieving the proper angle of attack of the aerodynamically shaped foils 24. A second hydraulic motor 52 moves a piston up and down that attaches to the inner portion of the cam frame 26 to engage or disengage the cam frame 26 from the roll unit 32. In particular, FIG. 3A shows the piston withdrawn thereby lowering the cam frame 26 such that the roller units 32 do not engage the inner and outer tilted cam tracks 28, 30. This position disengages the windmill 10 when desired. FIG. 3B shows the piston extending from motor 52 extended, which moves the cam track 26 into contact with the roller units 32, which represent the operational position of the windmill 10.

In operation the windmill 10 functions to keep the aerodynamically shaped foils 24 positioned at an optimum angle in relationship to the wind direction. As shown in FIG. 1, the position of orientation of the aerodynamically shaped foils 24 changes as the foils 24 rotate about the central rotating shaft 12. In particular, when the roller unit 32 is engaged with the inner and outer tilted cam tracks 28, 30 such that the pivotable roller 36 is substantially parallel the aerodynamically shaped foils 24 are neutrally positioned with regard to the wind. Continued rotation of the aerodynamically shaped foils 24 will move the pivotable roller 36 along the inner and outer tilted cam tracks 28, 30 such that one end of the pivotable roller 36 is positioned above the other end. Thus, as the roller unit 32 proceeds along the inner and outer tilted cam tracks 28, 30, the pivotable roller 36 moves between the two extremes of position shown in FIG. 1. This in turn moves the arm 34 back and forth, along with the tilt assembly 38. Movement of the arm 34 between the extremes of motion shown in FIG. 1 extends and retracts the extension member 48 of the tilt assembly 38, which in turn rotates the tilt collar 46 attached to the shaft 50 of the aerodynamically shaped foil 24. This movement dynamically positions the aerodynamically shaped foil 24 at an appropriate angle of attack that will create lift as the aerodynamically shaped foil 24 moves upwind and downwind.

The size and shape of the tilt assembly 38 and roller unit 32, along with the shape of the aerodynamically shaped foil 24 are such that the optimum angle attack is maintained throughout the cycle of rotation of the aerodynamically shaped foil 24. The dynamics of these relationships and angles are generally well understood and documented in the art. Accordingly, it will be understood by those of general skill in the art that the Figures do not necessarily depict or reference a specific angle of attack in reference to a specific wind direction. The specific mechanical relationship between the cam frame 26, inner and outer tilted cam tracks 28, 30, roller unit 32, and tilt assembly 38, however, presents an arrangement of components that is unique in its simplicity and operation. Accordingly, the windmill 10 of the present invention through its specific arrangement of components is naturally advantageous over prior art designs.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art that have the disclosure before them will be able to make modifications and variations therein without departing from the scope of the invention. For example, the windmill 10 of the present invention could be adopted for use in moving water.

What is claimed is:

1. A windmill, said windmill comprising:
    a central rotating shaft with an upper and a lower end opposite thereto;
    a blade arm with an inward and an outward end opposite thereto, wherein said inward end of said blade arm is connected to said upper end of said rotating shaft;
    an aerodynamically shaped foil connected to said outward end of said blade arm;
    a cam frame connected to said central rotating shaft such that said cam frame remains substantially stationary when said central rotating shaft rotates;
    an outer tilted cam track connected to said cam frame;
    an inner tilted cam track connected to said cam frame and located inside said outer tilted cam track, wherein an axis of tilt of said outer cam track and an axis of tilt of said inner cam frame are transversely aligned;
    a roller unit comprising an arm connected to said blade arm and extending downward and a pivotable roller connected thereto, wherein said pivotable roller is in operable contact with said inner and said outer cam track such that when said blade arm rotates said pivotable roller pivots between said axes of said inner and outer cam tracks; and
    a tilt assembly connected to said roller unit and to said foil for tilting said foil in response to movement of said roller on said axes of said inner and outer cam tracks in order to maintain an appropriate angle of attack relative to the wind.

2. The invention in accordance with claim 1 wherein said cam frame is rotatable about said central shaft according to the wind direction.

3. The invention in accordance with claim 2 further comprising a hydraulic motor connected to said cam frame for rotating said frame.

4. The invention in accordance with claim 3 further comprising a gear connected to said frame and a chain surrounding said gear and driven by said motor for rotating said frame.

5. The invention in accordance with claim 3 further comprising a wind sensor in operable communication with said motor for positioning said frame.

6. The invention in accordance with claim 1 wherein said aerodynamically shaped foil is wing shaped.

7. The invention in accordance with claim 1 further comprising a plurality of blade arms each with inward and outward ends opposite thereto, wherein said inward ends of said blade arms are connected to, and radially disposed about, said upper end of said rotating shaft.

8. The invention in accordance with claim 7 further comprising a plurality of aerodynamically shaped foils wherein one of said foils is connected to each of said plurality of blade arms at said outward ends.

9. The invention in accordance with claim 8 wherein said plurality of aerodynamically shaped foils are wing shaped.

10. The invention in accordance with claim 1 wherein said roller unit further comprises a roller collar extending upward from said pivotable roller, and said aerodynamically shaped foil further comprises a vertical shaft, and said tilt assembly comprises an extension member connected at one end to said roller collar and connected to a tilt collar at an opposite end and said tilt collar is connected to said vertical shaft, such that pivotable movement of said pivotable roller translates into movement of said aerodynamically shaped foil.

* * * * *